United States Patent [19]
Jones

[11] 3,792,872
[45] Feb. 19, 1974

[54] OCCUPANT RESTRAINT SYSTEM

[75] Inventor: Trevor O. Jones, Birmingham, Mich.

[73] Assignee: General Motors Corporation, Detroit, Mich.

[22] Filed: Apr. 25, 1972

[21] Appl. No.: 247,329

[52] U.S. Cl. ............... 280/150 AB, 137/38, 137/45, 137/625.47, 137/625.16, 222/3, 251/76, 251/209
[51] Int. Cl. ............................................. B60r 21/08
[58] Field of Search ..... 280/150 AB; 222/3; 137/38, 137/39, 45, 46, 625.47, 625.16; 251/310, 76, 211, 205, 206, 207, 208, 209

[56] References Cited
UNITED STATES PATENTS

| | | | |
|---|---|---|---|
| 2,834,609 | 5/1958 | Bertrand | 280/150 AB |
| 3,425,712 | 2/1969 | Berryman | 280/150 AB |
| 2,755,125 | 7/1956 | Hodges | 280/150 AB |
| 2,834,606 | 5/1958 | Bertrand | 280/150 AB |
| 3,684,309 | 8/1972 | Uchiyamada | 280/150 AB |
| 2,115,910 | 5/1938 | Funk | 137/45 |
| 1,381,598 | 6/1921 | Stoll | 251/310 |
| 3,645,493 | 2/1972 | Manoogian | 251/310 |
| 3,135,293 | 6/1964 | Hulsey | 251/206 |

*Primary Examiner*—David Schonberg
*Assistant Examiner*—John P. Silverstrim
*Attorney, Agent, or Firm*—Herbert Furman

[57] ABSTRACT

An occupant restraint system for a vehicle includes a source of pressure fluid having an outlet sealed by a rupturable diaphragm. Upon receipt of an electrical signal from a sensor actuated by impact conditions experienced by the vehicle, detonators rupture the diaphragm to release the pressure fluid. A manifold assembly communicates the outlet of the pressure vessel with an inflatable occupant restraint cushion. Included in the manifold assembly is a valve arrangement which has a first orifice controlling venting of the sealed outlet of the pressure vessel to atmosphere and a second variable area orifice controlling communication of the outlet to the cushion. The valve arrangement includes an outer tubular member having a circumferential series of radial openings and a generally circular opening in a radial end wall thereof. An inner tubular member is rotatable within the first member and includes a circumferentially spaced series of radial openings which may be aligned and misaligned with the radial openings of the outer member to provide the first orifice. A radial end wall of the inner member is juxtaposed to the end wall of the outer member and includes a generally teardrop shaped opening which may be adjustably aligned with the wall opening of the first member to provide the variable area orifice. A releasable detent normally locates the inner member within the outer member with the radial openings aligned and the circular and teardrop openings misaligned. Thus, the outlet of the source is normally vented to atmosphere and blocked from communicating with the cushion. Pendulous weights are secured to the inner member. Upon receipt of an acceleration pulse of predetermined minimum amplitude and time, the weights rotate the inner member within the outer member to misalign the radial openings and close the first orifice. The teardrop shaped opening is partially aligned with the circular opening to provide a minimum area second orifice. The area of this orifice, up to a maximum area equal to that of the circular opening, is determined by the degree of alignment of the teardrop and circular openings which is controlled by the strength of the pulse up to a predetermined maximum. The first and second orifices can also be used in an occupant restraint system independently of the other.

8 Claims, 5 Drawing Figures

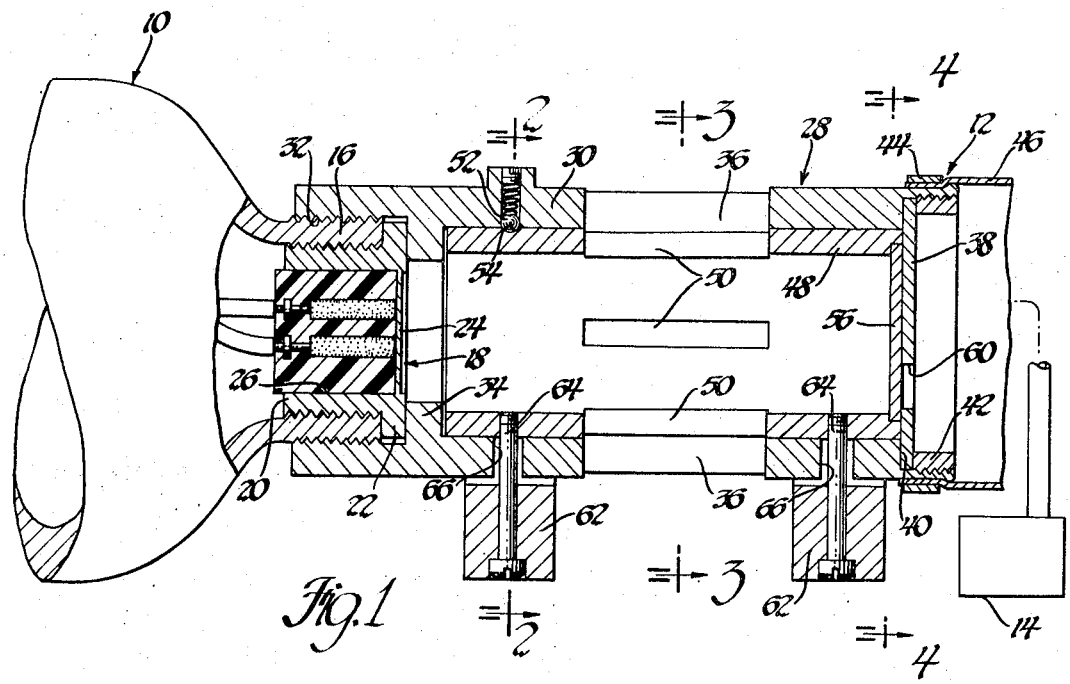

3,792,872

OCCUPANT RESTRAINT SYSTEM

This invention relates generally to vehicle occupant restraint systems of the type having a source of pressure fluid, an inflatable occupant restraint cushion, and a manifold assembly communicating the source and cushion, and more particularly to such a system wherein the manifold assembly includes a valve arrangement controlling communication of the source with the ambient atmosphere and the inflatable cushion.

The valve arrangement in its preferred embodiment includes a pair of relatively rotatable tubular members, each provided with radial and axial openings respectively arranged to provide first and second orifices respectively controlling communication of the source with the ambient atmosphere and with the cushion. The radial openings are alternately aligned or misaligned, while the axial openings are misaligned or varyingly aligned to full alignment to provide a variable area orifice. The radial openings are normally aligned and the first orifice normally communicates the sealed outlet of the source with the ambient atmosphere, while the axial openings are normally misaligned and the second orifice normally blocks communication of the sealed outlet of the source with the cushion. Thus, no inflation of the cushion can occur should the outlet be opened. Pendulous masses mounted to one of the members rotate the one member relative to the other under the influence of an acceleration pulse of predetermined minimum amplitude and time to misalign the radial openings and close the first orifice. The axial openings are partially aligned to partially open the second orifice and provide a predetermined minimum area orifice controlling flow of the pressure fluid to the cushion when the sealed outlet is ruptured. The area of the second orifice, up to a predetermined maximum area, is controlled by the degree of alignment of the openings which in turn is determined by the strength of the pulse, up to a predetermined maximum. The area of the second orifice is thus variable from a predetermined minimum to a predetermined maximum in accordance with the pulse strength. Either orifice may be used independent of the other, if so desired, in the system.

One of the features of this invention is that it provides an improved vehicle occupant restraint system wherein a normally open orifice communicates the sealed outlet of the pressure fluid source to ambient atmosphere and is closed to block such communication when an acceleration pulse of predetermined minimum amplitude and time is generated upon impact of the vehicle with an obstacle. Another feature of this invention is that it provides an improved vehicle occupant restraint system wherein a variable area orifice normally blocks communication of the sealed outlet of the pressure fluid source with the cushion and communicates the outlet, when the seal is ruptured, with the cushion, the area of the orifice, between a predetermined minimum and a predetermined maximum being controlled by the strength, between a predetermined minimum and a predetermined maximum, of the pulse resulting from impact of the vehicle with an obstacle. A further feature is that the orifices are both included in a valve arrangement so that the outlet of the pressure fluid source is alternately communicated with the atmosphere or with the cushion by the orifices. Yet another feature of this invention is that the orifice communicating the sealed outlet with the atmosphere is provided by a telescopic pair of relatively rotatable tubular members having respective openings located radially of the flow path of the pressure fluid, such openings being normally aligned and being misaligned or closed when an acceleration pulse of predetermined minimum amplitude and time is received by the members. Yet a further feature of this invention is that the variable area orifice is provided by a pair of radial plates on the members, one plate having a circular opening and the other having a generally teardrop shaped opening, the openings being normally misaligned and being alignable between a predetermined partial alignment and full alignment in accordance with the strength of the inertial forces resulting from impact of the vehicle with an obstacle.

These and other features of this invention will be readily apparent from the following specification and drawings wherein:

FIG. 1 is a sectional view of an occupant restraint system according to this invention, with the valve arrangement shown in normal position;

FIG. 2 is a sectional view taken generally along the plane indicated by line 2—2 of FIG. 1;

FIG. 3 is a sectional view taken generally along the plane indicated by line 3—3 of FIG. 1, with the valve arrangement shown in dash lines in its position when the members are subjected to a pulse equal to or exceeding a predetermined maximum;

FIG. 4 is a sectional view taken generally along the plane indicated by line 4—4 of FIG. 1; and FIG. 5 is a view similar to FIG. 4 showing the variable area orifice completely open.

Referring now particularly to FIG. 1 of the drawings, an occupant restraint system according to this invention includes a source 10 of pressure fluid, a manifold assembly 12 communicating with the source and an inflatable occupant restraint cushion 14. Since the pressure vessel which provides source 10 is conventional and the communication of the manifold 12 with the cushion 14 is likewise conventional, the details thereof are not shown. Reference may be had to application Ser. No. 142,533 Noll et al., filed May 12, 1971, for the details of these comonents of the system.

The internally and externally threaded neck or outlet 16 of the pressure vessel has one end thereof sealed by what is commonly known as a plug 18. This plug includes a threaded body 20 which is threaded into the outlet 16 and an annular flange 22 which seats against the end wall of the outlet 16. An integral diaphragm 24 closes the bore 26 of the body which normally receives, as shown, a pair of conventionally electrically fired detonators seating against the diaphragm and located in place by conventional stemming compound. A valve arrangement designated generally 28 is included in the manifold assembly which communicates the outlet 16 of the pressure vessel with the cushion 14. This valve arrangement includes an outer tubular member 30 having an internally threaded one end 32 which receives the outlet 16 and the flange 22 of plug 18. The internal radial flange 34 of member 30 seats against the flange 22 to hold the flange in place against the end of the neck 16. The member 28 further includes four equally circumferentially spaced radial slots or openings 36 and a radial end wall or plate 38 received within the counterbored other end of the member and seating against flange 40. A bushing 42 holds plate 38 in place. A clamp ring 44 secures the other end of the member 30 to a tube 46 of the manifold assembly 12.

A second tubular member 48 is rotatably received within the member 30. Member 48 includes four equally circumferentially spaced radial openings or slots 50 which are respective to the openings 36 and are alternately aligned and misaligned with such openings as will be further described. A conventional ball detent assembly 52 mounted on member 30 normally has the ball thereof seating in a depression 54 of member 48 to locate the member 48 as shown and locate the openings 36 and 50 in alignment. The openings 36 and 50 thus provide normally open first orifices which communicate the sealed outlet 16 with the ambient atmosphere. The member 48 further includes a radial end wall or plate 56 which is suitably secured thereto and juxtaposed to plate 38. As best shown in FIGS. 2 through 5 of the drawings, the plate 56 includes a generally teardrop shaped opening 58 having its centerline generated about the axes of members 30 and 48 and which may be variably aligned with a generally circular opening 60 of plate 38 to provide a second or variable area orifice as will be further described controlling communication of outlet 16, when diaphragm 24 is ruptured, with cushion 14.

A pair of counterbored pendulous masses 62 are secured to the member 48 by means of bolts 64 which extend through partially circumferential slots 66 of member 30 as best shown in FIGS. 1 and 2 and are threaded to member 48.

Normally, the member 48 is located as shown in FIGS. 1, 2, and 4 with the openings 36 and 50 in alignment with each other and with the teardrop shaped opening 58 misaligned with respect to the opening 60. Thus the first orifice defined by openings 36 and 50 communicates the sealed outlet 16 to ambient atmosphere while the second orifice defined by openings 58 and 60 blocks any communication between the sealed outlet 16 and the cushion 14. Thus, if for any reason the diaphragm 24 should be ruptured, the pressure fluid from the source 10 will flow into the member 48 and thence radially outwardly through the aligned openings 36 and 50 to ambient atmosphere and the cushion 14 will remain uninflated. By providing the openings 36 and 50 in a radially directed relationship to the flow of the pressure fluid, the reaction forces are substantially balanced.

Should the vehicle on which the system is mounted receive an acceleration pulse of predetermined minimum amplitude and time due to impact of the vehicle with an obstacle, the pendulous masses 62 will rotate the member 48 through a minimum arc clockwise, as viewed in FIGS. 2 and 3, relative to the member 30 so that the openings 50 will move out of any alignment with the openings 36 and will be located intermediately thereof, as shown in dash lines in FIG. 3. The minimum pulse will be set by adjusting the weight of weights 62 and the force of ball detent 52 engaging depression 54 and will also take into account the friction between members 30 and 48. This blocks communication of the outlet 16 of the source 10 with the atmosphere. As the member 48 so rotates within the member 30, the teardrop shaped opening 58 will move relative to the opening 60 from its full line position shown in FIGS. 2 and 3 to its dash line position shown in FIG. 3 to provide a partially open second orifice of predetermined minimum area communicating the outlet 16 with the cushion 14 when the diaphragm 24 is ruptured to open outlet 16.

The pulse which is received by the pendulous masses will also be sensed by the sensor or other means on the vehicle body which initiates electrical firing of the detonators to rupture the diaphragm 24 and release the contents of the pressure vessel of source 10 for flow to the cushion 14 through the member 48, the second orifice, and the tube 46 of the manifold assembly 12. Reference may be had to Ser. No. 175,576 Jones, filed Aug. 27, 1971, for a disclosure of a suitable sensor and circuit for the firing of detonators when a pulse of predetermined minimum amplitude and time is received by the vehicle. This minimum pulse level must be at least equal to or slightly greater than the pulse level required to provide the minimum area second orifice defined by openings 58 and 60, as previously explained.

Should the pulse received by the vehicle equal or exceed a predetermined maximum, the member 48 will be rotated through a maximum arc relative to the member 30 as the weights 62 move from their full line position shown in FIG. 3 to the dash line position shown therein wherein the bolts 64 engage the ends 68, FIG. 2, of slots 66 and the ball detent 52 engages an additional depression 70 of member 48. Openings 50 will remain out of alignment with openings 36 and the circular end of opening 58 will be aligned with opening 60 so that the second orifice will be of maximum flow area.

The flow area of the second orifice defined by the openings 58 and 60 will, of course, vary between the predetermined minimum shown in dash lines in FIG. 2 and the predetermined maximum shown in full lines in FIG. 5 in accordance with the pulse level exceeding the predetermined minimum and at least equalling the predetermined maximum.

The relative position of the member 48 within the member 30, between its position shown in FIGS. 1 and 2 and its terminal position when it has moved through its full arc of movement, is, of course, under the influence of the pulse level received. During movement of the member 48 between these positions, or to any position intermediate, the ball detent assembly 52 will ride on the outer surface of the member 48 and will also act to retain the member 48 in any of its intermediate positions so that the relative position of the opening 58 with respect to the opening 60, which defines the flow area of the second orifice, will be maintained for a sufficient period of time for flow of the pressure fluid to the cushion 14. The teardrop shape of the opening 58 provides a wide range of flow areas or orifices defined by this opening and the opening 60. While a teardrop shaped opening is preferred, it should be noted that the opening may be circular or of other shape.

If desired, the plates 38 and 56 may be dispensed with and only the openings 36 and 50 used to provide the orifice for venting of the sealed outlet 16 to ambient atmosphere. Likewise the openings 36 and 50 may be dispensed and only the openings 58 and 60 used to provide the variable area orifice controlling flow of the pressure fluid to the cushion 14.

Thus, this invention provides an improved occupant restraint system.

I claim:

1. An occupant restraint system comprising, in combination, a source of pressure fluid having a diaphragm sealed outlet, an inflatable occupant restraint cushion, and a valve arrangement selectively and alternately communicating the outlet of the pressure fluid source with the ambient atmosphere or with the inflatable occupant restraint cushion and including a pair of relatively movable members, each including a pair of openings therein, one opening of one member being alignable and misalignable with a respective opening of the other member to provide respective pairs of openings, one respective pair of openings communicating the outlet with the ambient atmosphere when aligned and the other respective pair of openings communicating the outlet with the inflatable cushion when aligned, the one pair being normally aligned and the other pair being normally misaligned, means for moving the members relative to each other in response to an acceleration pulse of predetermined amplitude and time, and means for misaligning the one pair and aligning the other pair upon movement of the members relative to each other.

2. An occupant restraint system comprising, in combination, a source of pressure fluid having a diaphragm sealed outlet, an inflatable occupant restraint cushion, and a valve arrangement for selectively and alternately communicating the outlet of the pressure fluid source with the ambient atmosphere or with the inflatable occupant restraint cushion and including a pair of concentric relatively rotatable hollow members, each including a plurality of radial openings in the peripheral wall thereof and an axial opening in a radial wall thereof, the radial openings of one member being alignable and misalignable with the radial openings of the other member and the axial openings being alternately alignable and misalignable, the radial openings communicating the outlet with the ambient atmosphere when aligned and the axial openings communicating the outlet with the inflatable cushion when aligned, the radial openings being normally aligned and the axial openings being normally misaligned, and means for rotating the members relative to each other to misalign the radial openings and align the axial openings upon receipt by the members of an acceleration pulse of predetermined amplitude and time.

3. An occupant restraint system comprising, in combination, a source of pressure fluid having a diaphragm sealed outlet, an inflatable occupant restraint cushion, and a valve arrangement for selectively and alternately communicating the outlet of the pressure fluid source with the ambient atmosphere or with the inflatable occupant restraint cushion and including a pair of relatively movable members, each including a pair of openings therein, one opening of one member being alternately alignable and misalignable with a respective opening of the other member to provide a first orifice communicating the outlet with the ambient atmosphere when the one openings are aligned and blocking such communication when the openings are misaligned, the other opening of one member being varyingly alignable with the other opening of the other member to provide a variable area orifice communicating the outlet with the inflatable cushion, the one openings being normally aligned and the other openings being normally substantially misaligned, and means for misaligning the one openings and providing a predetermined minimum alignment of the other openings upon receipt by the members of an acceleration pulse of predetermined minimum amplitude and time.

4. An occupant restraint system comprising, in combination, a source of pressure fluid having a sealed outlet, an inflatable occupant restraint cushion, and a valve arrangement for selectively and alternately communicating the outlet of the pressure fluid source with the ambient atmosphere or with the inflatable occupant restraint cushion and including a pair of relatively movable members, each including a plurality of first openings therein and a second opening therein, the plurality of openings of one member being alternately alignable and misalignable with the respective plurality of openings of the other member to provide a plurality of first orifices communicating the outlet with the ambient atmosphere when the plurality of openings are aligned and blocking such communication when the plurality of openings are misaligned, the second opening of one member being varyingly alignable with the second opening of the other member to provide a variable area orifice communicating the outlet with the inflatable cushion, the first openings being normally aligned and the second openings being normally substantially misaligned, and means for misaligning the first openings and providing a predetermined minimum alignment of the second openings upon receipt by the members of an acceleration pulse of predetermined minimum amplitude and time.

5. An occupant restraint system comprising, in combination, a source of pressure fluid having a sealed outlet, an inflatable occupant restraint cushion, and a valve arrangement for selectively and alternately communicating the outlet of the pressure fluid source with the ambient atmosphere or with the inflatable occupant restraint cushion and including a pair of concentric relatively rotatable hollow members having juxtaposed radial and axial walls, each including a plurality of first openings in the radial wall thereof and a second opening in the axial wall thereof, the first openings of one member being alternately alignable and misalignable with respective first openings of the other member to provide a plurality of first orifices communicating the outlet with the ambient atmosphere when the first openings are aligned and blocking such communication when the first openings are misaligned, the second opening of the inner member being of teardrop shape and being varyingly alignable with the second opening of the other member to provide a variable area orifice communicating the outlet with the inflatable cushion, the first openings being normally aligned and the second openings being normally substantially misaligned, and means for misaligning the first openings and providing a predetermined minimum alignment of the second openings upon receipt by the members of an acceleration pulse of predetermined minimum amplitude and time.

6. An occupant restraint system comprising, in combination, a source of pressure fluid having a sealed outlet, an inflatable occupant restraint cushion, and a valve arrangement for selectively and alternately communicating the outlet of the pressure fluid source with the ambient atmosphere or with the inflatable occupant restraint cushion and including a pair of coaxial hollow tubular members, each including juxtaposed radial and axial walls, each member including a plurality of first openings in the radial wall thereof and a second opening in the axial wall thereof, the first openings of the inner member being alternately alignable and misalignable with respective first openings of the outer member to provide a plurality of first orifices communicating the outlet with the ambient atmosphere when the first openings are aligned and blocking such communication when the first openings are misaligned, the second opening of the inner member being of teardrop shape and symmetrical about a center line generated about the axis of the members, the second opening of the inner member being varyingly alignable with the second circular opening of the outer member to provide a variable area orifice communicating the outlet with the inflatable cushion, the first openings being normally aligned and the second openings being normally substantially misaligned, and means rotating the inner member within the outer member to misalign the first openings and provide a predetermined minimum alignment of the second openings upon receipt by the members of an acceleration pulse of predetermined minimum amplitude and time.

7. An occupant restraint system comprising, in combination, an inflatable occupant restraint cushion, a source of pressure fluid having an outlet sealed by a rupturable diaphragm, a first tubular member communicating with the source and with the inflatable occupant restraint cushion and including a radial wall having an opening therein communicating the tubular member with the cushion, a second tubular member coaxially rotatable relative to the first member and including a radial wall having an opening therein communicating the second member with the cushion, one opening being generally circular and the other opening being generally teardrop and movable to varying positions of alignment with respect to the one upon relative movement of the members to provide a variable area orifice, means normally locating the openings in substantial misalignment with each other to block communication of the pressure fluid source with the cushion, and means responsive to an acceleration pulse of predetermined minimum amplitude and time for rotating the tubular members relative to each other to provide a predetermined minimum alignment of the openings and a predetermined minimum area orifice communicating the pressure fluid source with the cushion upon rupture of the diaphragm.

8. An occupant restraint system comprising, in combination, an inflatable occupant restraint cushion, a source of pressure fluid having an outlet sealed by a rupturable diaphragm, a first annular member including an opening communicating with the source and with the inflatable occupant restraint cushion, a second annular member movable relative to the first member and including an opening adjustably alignable with the opening of the first member to provide a series of variable area orifices communicating the outlet of the pressure fluid source with the cushion, and means for moving the annular members relative to each other to adjust the position of the second member opening with respect to the first member opening in response to the relative strength of an acceleration pulse of predetermined amplitude and time received by the members.

* * * * *